United States Patent [19]
Camiade et al.

[11] Patent Number: 5,191,345
[45] Date of Patent: Mar. 2, 1993

[54] CIRCUIT TO INCREASE THE INFORMATION BIT RATE IN A SYSTEM FOR THE EXCHANGE OF DATA

[75] Inventors: Marc Camiade, Antony; Pierre Quentin, Paris; Pierre Savary, Les Ulis; Jean-Philippe Brandeau, Palaiseau, all of France

[73] Assignee: Thomson Composants Microondes, Puteaux, France

[21] Appl. No.: 793,095

[22] Filed: Nov. 15, 1991

[30] Foreign Application Priority Data

Nov. 16, 1990 [FR] France .................. 90 14291

[51] Int. Cl.$^5$ .................................... G01S 13/74
[52] U.S. Cl. ................................ 342/44; 342/51
[58] Field of Search .................... 342/44, 50, 51

[56] References Cited

U.S. PATENT DOCUMENTS 3,918,057 11/1975 Van Tol .......................... 342/51
4,656,472 4/1987 Walton ........................ 342/51 X

FOREIGN PATENT DOCUMENTS 0558130 7/1982 Australia .
0245555 11/1987 European Pat. Off. .
0297688 1/1989 European Pat. Off. .

Primary Examiner—T. H. Tubbesing
Attorney, Agent, or Firm—Oblon, Spivak, McClelland, Maier & Neustadt

[57] ABSTRACT

In a system for the exchange of data by microwaves between a fixed station and a mobile station or portable badge, the information bit rate is limited, in the standby state, by the low power consumption of the badge and the high output impedance of the modem. To increase the information bit rate of the modem of a badge, the information processing circuit associated with the modem sends the modem an activation signal to reduce its output impedance. The means implemented are transistors that switch over the load of the detector transistor or of the amplifier transistor.

4 Claims, 2 Drawing Sheets

CIRCUIT TO INCREASE THE INFORMATION BIT RATE IN A SYSTEM FOR THE EXCHANGE OF DATA

FIELD OF THE INVENTION

The present invention relates to a system for the transmission of data by the modulation-demodulation of an electromagnetic wave, for two-way communication between a fixed station, called a beacon or reader, and a mobile station, called a badge or responder. More precisely, the invention relates to the modem (modulator-demodulator) of the portable badge, for which an improvement provided by the invention enables changing from a standby state, to which there corresponds a low power consumption rate as well as a low bit rate, to an active state, to which there corresponds a higher power consumption rate but a high bit rate, multiplied by a factor of the order of 100 or several hundred.

This type of data exchange can be applied to the control of moving bodies, for example in the identification of cars on a railroad, automobiles at a toll-gate or pedestrians at the entrance to a building.

The mobile station or badge takes the form of a chip card, and it has to be extremely economical in energy for it is supplied by small cells known as "buttons".

DESCRIPTION OF THE PRIOR ART

The general diagram of a system for the exchange of data by microwave electromagnetic radiation, according to the prior art, is fairly simple and FIG. 1 which represents it enables its elements and the abbreviations used to be specified.

A mobile station or badge 1 includes a microwave modem 3, an information processing part 4 and a supply 5. The exchanges between these two parts relate to the operation of modulation/demodulation and to the transmission/reception commands.

The fixed station or beacon 2 includes a microwave source, a microwave modem 6, an information processing part 7 and a computer 8 which enables the management of all the radioelectrical exchanges carried out with the badges, by means of an antenna 9 for each badge and an antenna 10 for each beacon or reader.

The following values will be used:
d = distance between the antennas 9 and 10,
$G_l$ = gain of the antenna 10 of the reader 2
$G_b$ = gain of the antenna 9 of the badge 1
$P_{li}$ = power transmitted at the antenna of the reader 2
$P_{lr}$ = power received by the antenna of the reader
$P_{bi}$ = power transmitted at the antenna of the badge 1
$P_{br}$ = power received by the antenna of the badge The modulations used in these systems are generally of the OOK (on-off keying amplitude modulation), PSK (0/$\pi$ phase-shift keying phase modulation) or FSK (frequency-shift keying) type.

The modem functions differently when the beacon interrogates the badge than when the badge responds to the beacon.

In the mode in which the badge 1 is interrogated by the reader 2, the reader 2 generates ($P_{li}$) a modulated microwave signal. The badge receives this signal ($P_{br}$) and demodulates it: this is a step that enables the activation of the badge which has been in the standby state.

In the mode in which the badge 1 is responding to the reader 2, the reader then generates a non-modulated microwave signal. The badge receives this signal, modulates it, i.e. loads it with the information on which it has been interrogated and re-transmits a signal comprising, as the case may be, either losses or gain.

Indeed the badge may be:
passive, i.e. the power it transmits is always lower than the power it receives ($P_{bi} < P_{br}$), and the energy is given to it by the reader.

or active, i.e. it includes a microwave amplifier ($P_{bi} > P_{br}$), which therefore implies that there is a supply source such as cells. There are therefore problems of energy consumption at least on the badge side, that are equivalent to the problems of obtaining the sensitivity of the badge in the vigil state, hence under conditions of very low power consumption, obtaining the sensitivity of the reader in taking account of the low level of transmission of the badge, and problems of parasitic phenomena contributed by other systems operating at a nearby frequency.

But, in addition, there are problems of digital information bit rates. The saving of energy needed when the badge is in the standby state (which is its most usual state) requires the demodulation function to be carried out under very high impedance: the time constants, related to the input capacitances and impedances of the circuits, limit the bit rates to some tens of kilobits/seconds, for example. These bit rates are not sufficient to provide for a normal traffic of information between a fixed station and several mobile stations or badges: it is necessary to achieve a rate of several megabits/second as soon as the badge is "activated" and enters into communication with the reader.

A high information bit rate, in turn, means that the modulation function of the modem should be under low impedance which, moreover, corresponds to a higher consumption of energy during the period of the response of the badge to the reader.

SUMMARY OF THE INVENTION

According to the invention the badge, in the vigil or standby state, transmits a series of information elements at low bit rates to its processing circuit 4. These information elements are identified by the processing circuit 4 as being an interrogation coming from the reader 2. The processing circuit 4 of the badge then "activates" the modem 3 by sending signals that act on the means which modify the impedance or impedances of the modem and enable it to respond with a high information bit rate to the interrogation of the reader.

More precisely, the invention relates to a circuit for the increasing of the information bit rate by electromagnetic microwaves, in a system for the exchange of data between a fixed station and a mobile station, called a portable badge, that includes a modem and an information processing circuit which are at high impedance and low electrical consumption in the standby state when the fixed station sends no signal, wherein as soon as the fixed station sends an interrogation signal at a low information bit rate (in the range of kilobits/second), transmitted by the modem to the processing circuit, said processing circuit sends a signal to "activate" the modem which acts on means for diminishing the output impedance of the modem, thus increasing the bit rate (up to the megabits/second range) of information elements exchanged with the fixed station.

BRIEF DESCRIPTION OF THE DRAWINGS

The invention will be understood more clearly from the following more detailed description, based on two variant embodiments, and on the appended figures of which.

MORE DETAILED DESCRIPTION

Figure 1:
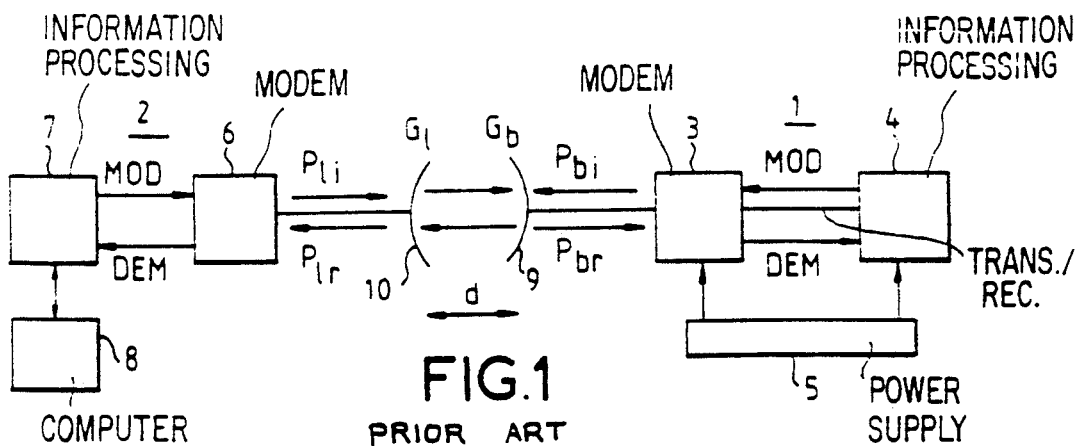
FIG. 1 shows a general diagram showing the exchange of data between a fixed station and a mobile station by electromagnetic waves, according to the prior art explained here above.
Figure 2:
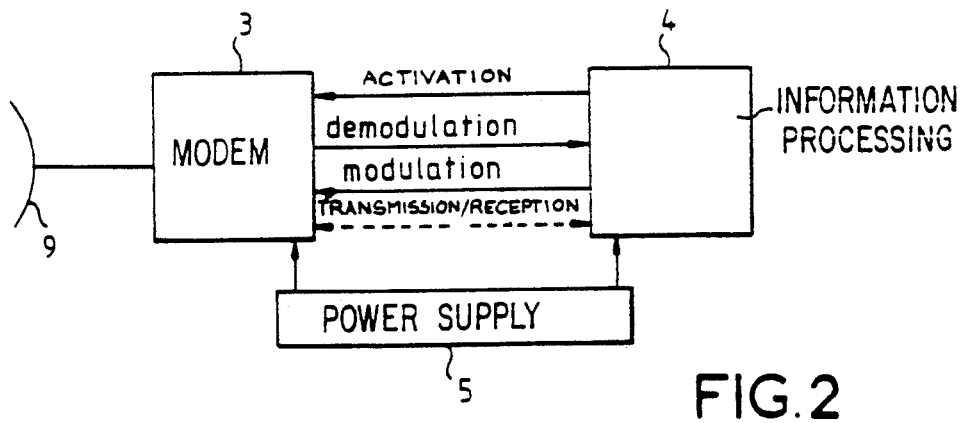
FIG. 2 shows a block diagram of the improvement provided by the invention to the mobile station or badge in a data exchange system.

FIG. 2 again shows the part of the badge 1 of FIG. 1, but shows a new link between the modem 3 and the information processing circuit 4.

In microwave systems comprising a fixed station or reader and a mobile station or badge, the transmission bit rates are generally limited in the reader-to-badge direction. Indeed, even if there is no particular problem in having a reader transmit at a high bit rate since its energy consumption is of little importance, it must be noted all the same that if the demodulation function of the badge is the only function, then there is only one power level and this function has to be carried out at high impedance since it corresponds to the standby state at very low power consumption—because of the "button" cells that supply the badge. The time constants, related to the high impedances of the modem 3 and to the input capacitances of the processing circuit 4, limit the demodulation bit rate to some tens of kilobits/second.

This low bit rate is sufficient to activate the information processing circuit 4 but insufficient to provide for data exchanges between a reader and a plurality of badges: several megabits/second are necessary.

According to the invention, when the processing circuit 4 detects an interrogation coming from the reader 2, it sends the modem 3 of the badge a signal that "activates" it and lowers its characteristic impedance values, thus permitting a high information bit rate.

The different links between the modem and the processing circuit of the badge are the following:

a demodulation link which transmits the demodulated interrogation coming from the reader to the processing circuit, thus starting up the processing a modulation link enabling the modulation of the carrier transmitted by the reader; this modulation constitutes the response of the badge transmitted to the reader;

an activation link: this is the object of the invention. This link enables the modification of the electrical state of the circuits (lowering of the impedance) to permit high transmission bit rates. The change in the logic state of this signal occurs as soon as the badge is activated;

a transmission-reception link (if necessary): this link exists in the case of a badge that requires a change in the electrical state of the modem between reception and transmission. This would be the case, for example, with a badge that is active in transmission, for which it would be necessary to modify the bias point or points of the active transistor or transistors as detectors or modulators.

The electrical states of the badge are therefore:

A—Standby this is the almost permanent state of the badge, when it is either spatially or temporally beyond the range of a fixed station;

the power consumption is very low, equal to some microamperes, limited to the demodulator 3 at very high impedance and to the supply of the activation chain of the processing circuit 4;

the activation information bit rate is therefore low, and is equal to some kilobits/second.

B—Reception this is the phase of interrogation of the badge by the reader, after it has been activated;

the processing circuits are all supplied;

the power consumption may be relatively high, equal to some milliamperes, for the time entailed by the reception mode is only very short as compared with the lifetime of the badge;

the information bit rates may be very high, equal to some megabits/second, owing to the degree of freedom with respect to the power consumption during a short period.

C—Transmission this is the stage in which the badge responds to the reader;

the processing circuits are all supplied;

the power consumption, during the short period of time for which the response lasts, enables the use of a function that is active in transmission with a gain in microwave frequencies;

the information bit rates may be high during a short time.

The method of activating the badge is based on a changing of the point of bias of the transistor which works as a detector in the modem 3.

To increase the bit rate of the demodulator of the badge, the operation is done at a higher bias current, thus reducing the impedances and the time constants.

Figure 3:
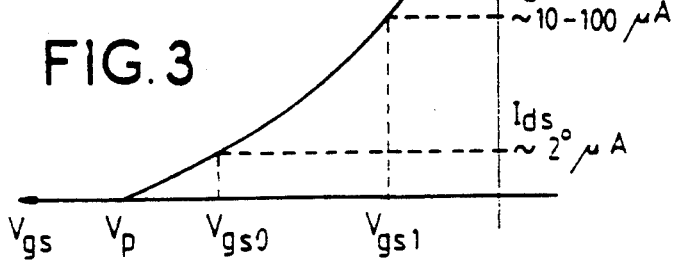
FIG. 3 shows a curve I(V) of a field-effect transistor corresponding to a first variant of the means implemented according to the invention.

FIG. 3 shows an example of a field-effect transistor, biased on its gate at a voltage $V_{gs0}$ close to the pinch-off voltage $V_p$: the transistor is in the standby state and this voltage $V_{gs0}$ corresponds to a low drain current $I_{ds}$, for example of 2 $\mu$A. To activate the badge, the gate bias voltage is switched over to a higher value $V_{gs1}$, to which there corresponds a higher drain current $I_{ds}$, for example between 10 and 100 $\mu$A, which reduces the impedances and time constants. If $I_{ds}$ goes from 2 $\mu$A to 20 $\mu$A, the information bit rate is multiplied by 10.

This phenomenon is limited only by the non-linearity of the field-effect transistor as a function of $V_{gs}$: it is known that if $V_{gs}$ is too high, the characteristic $I_{gs}(V_{gs})$ of the transistor, which is almost linear, is such that the detector function can no longer be available.

Figure 4:
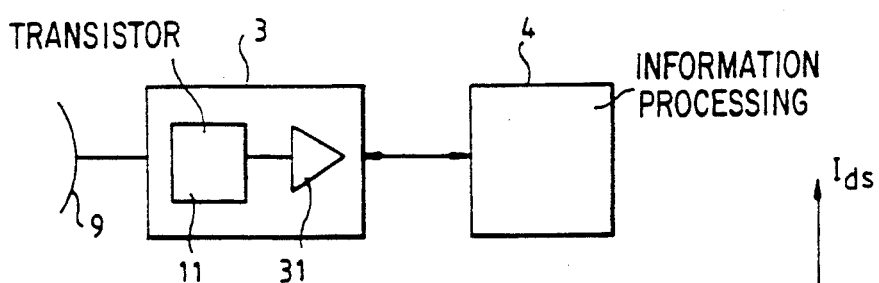
FIG. 4 shows a block diagram corresponding to a second variant of the means implemented according to the invention.

Should the information bit rate required be such that it cannot be achieved by a simple increase in the current, it is possible to use one or more amplifiers 31, in series with the detector transistor 11, in the modem 3, as shown in FIG. 4: it is the amplifier that is "activated" to transmit at a high bit rate.

The amplifier (or amplifiers) 31 works (or work) at the demodulation frequency and its (or their) bias voltage is changed, while the transistor 11 continues to be in a zone of optimum bias for the detection function. The principle of this assembly consists in reducing the load impedance of the detector and, hence, in increasing the information bit rate without changing its point of bias, and in compensating for the drop in level associated with the reduction in output impedance by the changing of the bias and hence by the increasing of the gain of the amplifier 31 which follows the detector 11.

Figure 5:
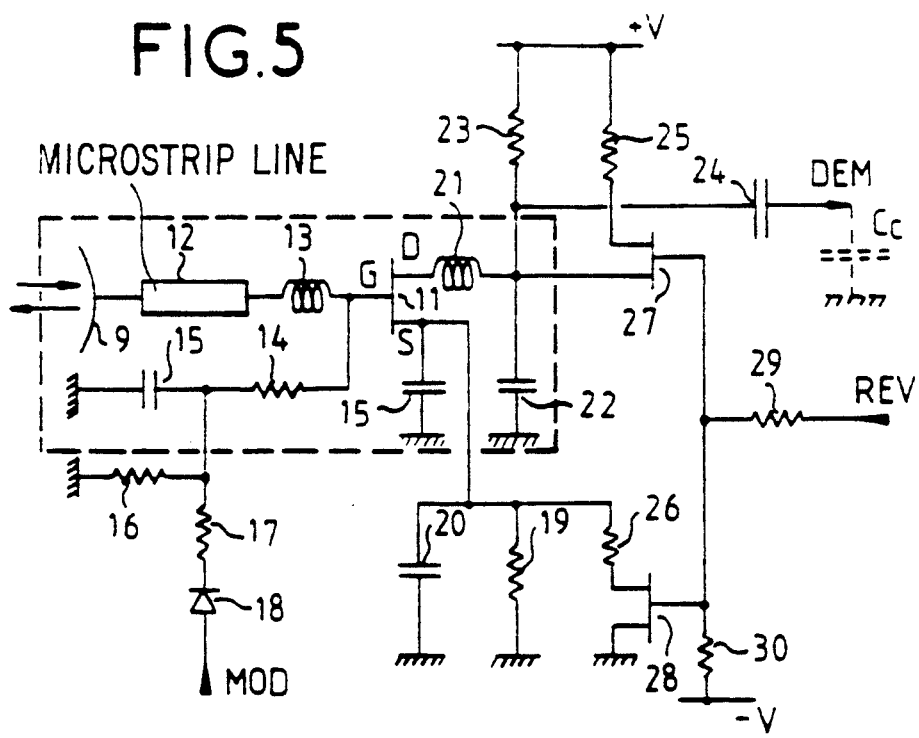
FIG. 5 shows the electrical diagram of the modem with high bit rate of a badge according to the first variant of the invention.

FIG. 5 shows the detailed electrical diagram of a modem with a high bit rate, made in integrated circuit form according to the invention, in which the point of bias of the transistor used as a detector is modified. The circuit shown is active in reception and passive in transmission, but other types of circuits may be adapted according to the invention.

This modem has a known microwave part in which the element 11 is a field-effect transistor that works as a detector. This transistor 11 is provided:

on its gate, with a circuit 13, 14 and 15 for the impedance matching of the antenna 9. The microstrip line 12 matches the antenna to the input of the integrated circuit. The divider bridge 16 and 17 enables the adjusting of the gate bias voltage and the diode 18 enables the gate to be modulated by means of an alternating signal;

at its source, with a decoupling capacitor 15 and a circuit 19 and 20 for self-biasing in vigil mode.

at its drain, with an impedance matching circuit 21 and 22, connected to the +V supply through a resistor 23, and to the demodulated output DEM through a coupling capacitor 24.

The capacitors 15 and 22 are microwave frequency decoupling capacitors. The resistance values of the device 23 and 19 are high, of the order of 100 kΩ and 500 kΩ respectively. It is these they that, in the standby state, bias the drain and the source, and consequently determine $V_{gs}$ and $I_{ds}$.

To activate the badge, these two bias resistors 23 and 19 are almost short-circuited by the two resistors 25 and 26, respectively, which have values of the order of 10 kΩ, i.e. values substantially below 100 and 500 kΩ.

The switching between the resistors 23 and 25, on the one hand, and the resistors 19 and 26, on the other hand, is done by means of the transistors 27 and 28 respectively, when they are in the on state. These switching transistors 27 and 28 are controlled by the information processing circuit 4, by a signal that is applied to the activation terminal REV and is limited by the resistor 29.

The resistor 30 places the gates of the switching transistors 27 and 28 at −V, if these transistors are not controlled or if the activation function is at high impedance: indeed, the high impedance state is often that of the logic gates of a processing circuit in "standby" mode. The transistors 27 and 28 are then off.

Figure 6:
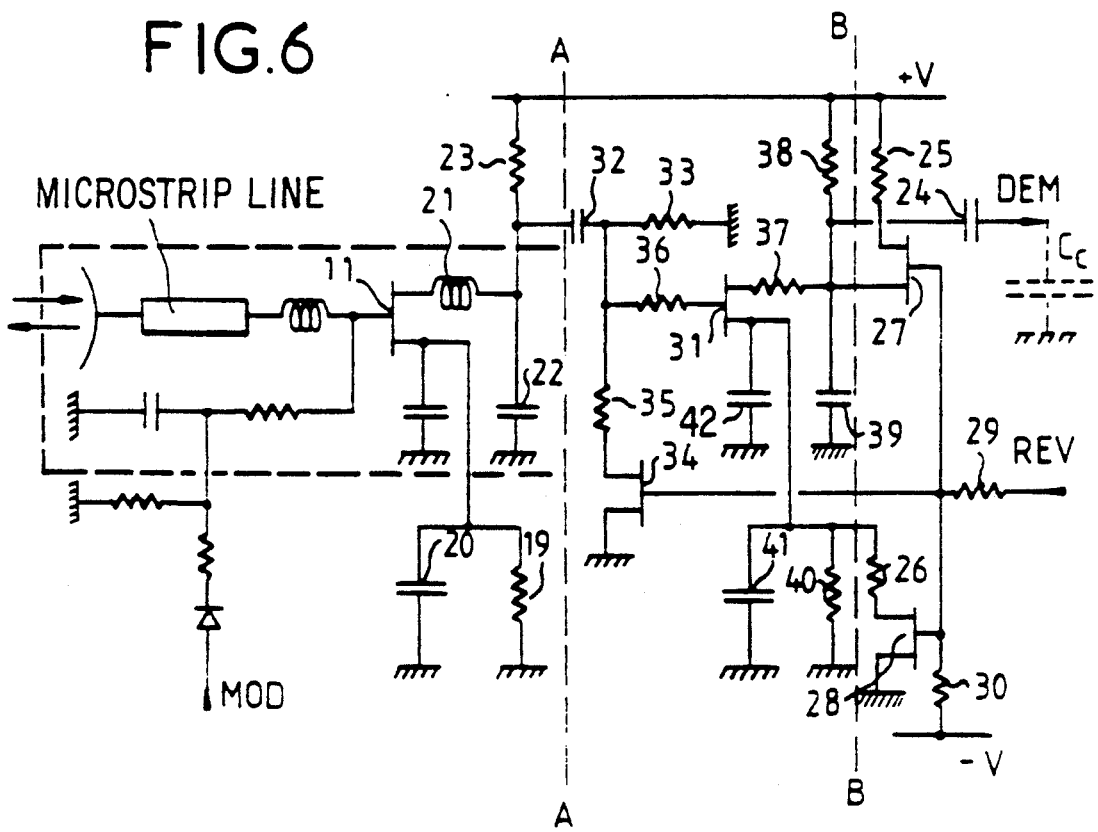
FIG. 6 is the electrical diagram of the modem with high bit rate of a badge according to the second variant of the invention.

FIG. 6 shows the detailed electrical diagram of a modem with a high bit rate, made in integrated circuit form according to the invention, but having an amplifier behind the detector transistor 11. By comparison with the previous figure, those skilled in the art will experience no difficulty in recognizing the parts common to these two circuits, namely:

to the left of the figure and of the line AA, the microwave part surrounded by a dashed box, to the right of the figure and of the line BB, the system of the two switching transistors 27 and 28, as well as their switched resistors 25 and 26 and their supply resistors 29 and 30.

The references have not all been indicated in order to avoid over-burdening the figure: if necessary, they can be deduced from FIG. 5.

The amplifier at the demodulation frequency is essentially constituted by at least one transistor 31, connected by means of a decoupling capacitor 32 to the load of the microwave transistor 11. At the demodulation frequencies, which are relatively low, the low frequency load of the transistor 11 is constituted by the resistor 23 (having resistance of about 100 kΩ), the capacitor 32 and the resistor 33 (having resistance of about 500 kΩ–1MΩ).

When the transistor 34 is controlled by the activation signal REV at the same time as the transistors 27 and 28, this transistor 34 switches over the low frequency load of the detector transistor 11: its load resistor 33 (0.5–1 MΩ) in the standby state is shunted by the low value (10 kΩ) resistor in the activated state.

The resistors 26 and 37 are resistors that stabilize the transistor 31 in the activated state: its drain load is constituted by the high value (about 100 kΩ) resistor 38 and the microwave frequency decoupling capacitor 39. Its source, which is decoupled by a capacitor 42, is self-biased by a resistor 40 and a capacitor 41, in the same way as the source of the detector transistor 11. Just like the resistor 19, the resistor 40 has resistance of a high value of about 500 kΩ.

Whereas, in the previous example, the switching transistors 27 and 28 switched over the drain and source resistors 19 and 23 of the detector transistor 11, in the present case:

the switching transistors 27 and 28 switch over the source and drain resistors 40 and 38 of the amplifier transistor 31, thus modifying its bias;

and the transistor 34 switches over the output impedance of the detector transistor 11, in shunting the high value resistor 33 by the low value resistor 35.

FIG. 6 shows only one amplification stage, between the lines AA and BB, between the detector stage and the activation stage by the changing of the bias points. If the information bit rate required of the badge has to be higher than that given with only one amplification stage, those skilled in the art will experience no difficulty in achieving a cascade-mounting of several amplification stages identical to the one shown: it is necessary only to see to it that each amplifier has its own activation stage, namely the transistors 27 and 28 and the associated circuits. The transistor 34 and its associated circuit 32 and 35, which switches over the output impedance of the detector transistor 11, continues to be the only unit fulfilling this function if there are several amplification stages. The demodulated output DEM is taken at the last amplifier.

Let the signal processing circuit 4 (FIG. 1) be considered to be equivalent to a load capacitor $C_c$, shown in dashes in FIGS. 5 and 6, and let the load conductance be disregarded. The time constants that limit the information bit rate at reception are, at an initial approximation:

for the circuit of FIG. 5 (changing of bias of the detector):

in the standby state:

$R_{23}(C_c+C_{22})$ in the activated state:

$R_{25}(C_c+C_{22})$ for the circuit of FIG. 6 (changing of bias of the amplifier):

in the vigil state:

$$R_{23} \cdot C_{22}$$

or $$R_{38}(C_c + C_{39})$$

in the activated state:

$$R_{35} \cdot C_{22}$$

or $$R_{25}(C_c + C_{39})$$

In each of the two states, it is one of the two time constants that limits the bit rate, before the other constant.

To have the highest information bits possible, it is therefore necessary:

in both cases, that the decoupling capacitances $C_{22}$ and $C_{39}$ of the transistors 11 and 31 should have values that are as low as possible, in the case of FIG. 5 (without amplifier) that $$R_{25} << R_{23}$$

in the case of FIG. 6 (with amplifier) that $$R_{35} << R_{23}$$

$$R_{25} << R_{38}$$

The two examples that have been explained use a semi-active type of modem. The invention can be applied to other types of modem for which, it suffices to change the bias of the detector transistor. In the same way, the embodiment in integrated circuit form does not limit the application of the invention, which can be made in hybrid circuit form, by means of microstrip lines that replace the inductors and capacitors.

What is claimed is:

1. A system for exchanging data by electromagnetic microwaves between a fixed station and a mobile station, said system including, at said mobile station, an information bit rate increasing circuit which comprises:

a modem and an information processing circuit;

means for maintaining said modem and said information processing circuit at a high impedance and low electrical consumption level when no signal is received at said mobile station from said fixed station;

said processing circuit including a means for sending a signal to activate said modem when said fixed station sends an interrogation signal at a low information bit rate transmitted by said modem to said processing circuit;

means responsive to said activation signal from said processing circuit, for diminishing the output impedance of said modem whereby the bit rate of information elements exchanged with said fixed station is increased.

2. A circuit according to claim 1, wherein said modem of said mobile station has at least one field-effect transistor for detecting the receipt of signals transmitted by said fixed station and wherein said modem also functions as a modulator for the transmission of signals to said fixed station from said mobile station and wherein said activation signal from said processing circuit for activating said modem results in an increase in the gate-source bias voltage of the field-effect transistor which causes an increase in the drain-source current of said field-effect transistor and thereby a reduction in the output impedance of said transistor.

3. A circuit according to claim 2 wherein said means for reducing the output impedance of said transistor includes at least one switching transistor which, when controlled by said activation signal from said processing circuit, switches from at least one of a high value load resistor of the drain of said transistor and a source of said transistor to a resistor of a lower value.

4. A circuit according to claim 1, wherein said modem of said mobile station has at least one detection field-effect transistor whose output is connected to at least one amplifier transistor and wherein said means for reducing said output impedance includes at least one switching transistor which switches from a high value resistor of the drain of said detector transistor to a resistor of a lower value and wherein said means for reducing the output impedance also includes at least one secondary switching transistor which switches from at least one of a high value load resistor, of the drain and of the source of the amplifier transistor to a second switch resistor of lower value.

* * * * *